Nov. 15, 1960     E. JÄGER     2,959,862
MICROMETER GAUGE
Filed May 6, 1958     3 Sheets-Sheet 1
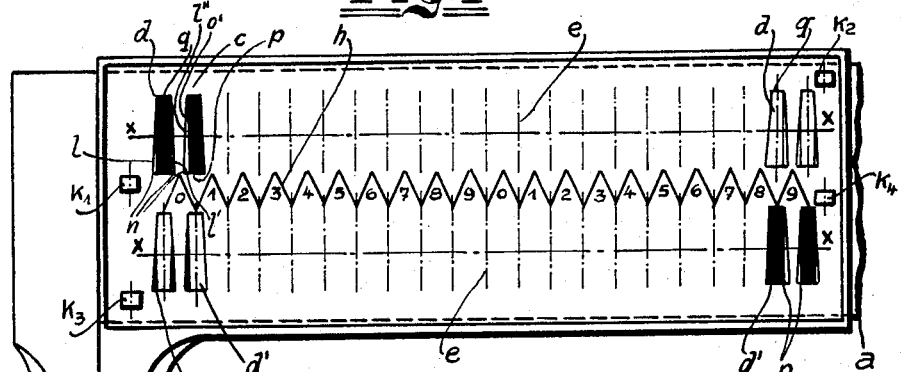
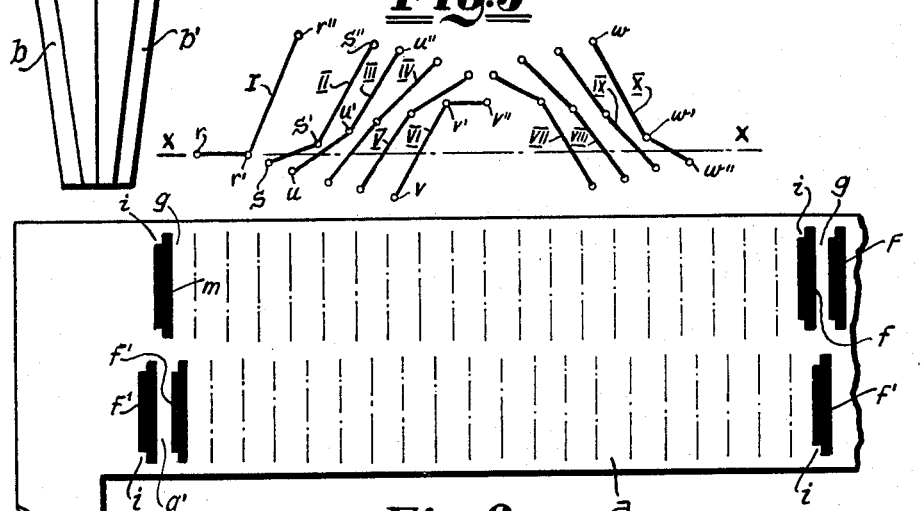
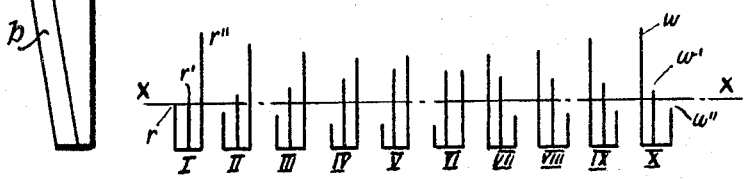
INVENTOR
Emil Jäger
BY Michael S. Striker
Attorney Nov. 15, 1960  E. JÄGER  2,959,862
MICROMETER GAUGE Filed May 6, 1958  3 Sheets-Sheet 2

INVENTOR

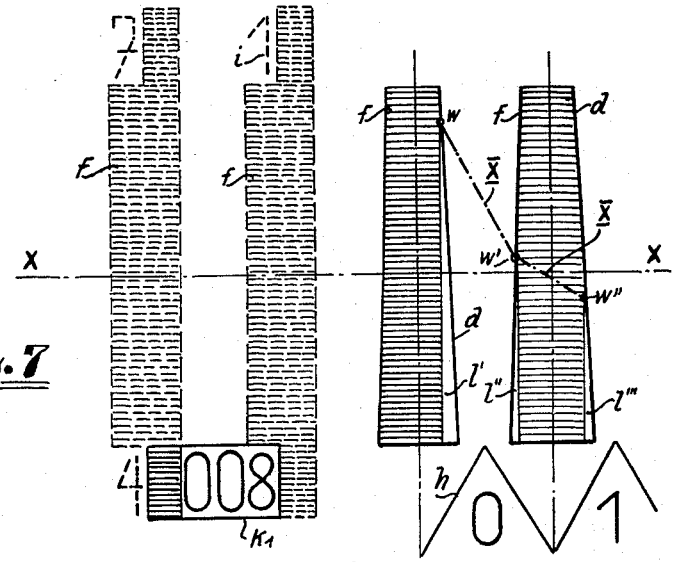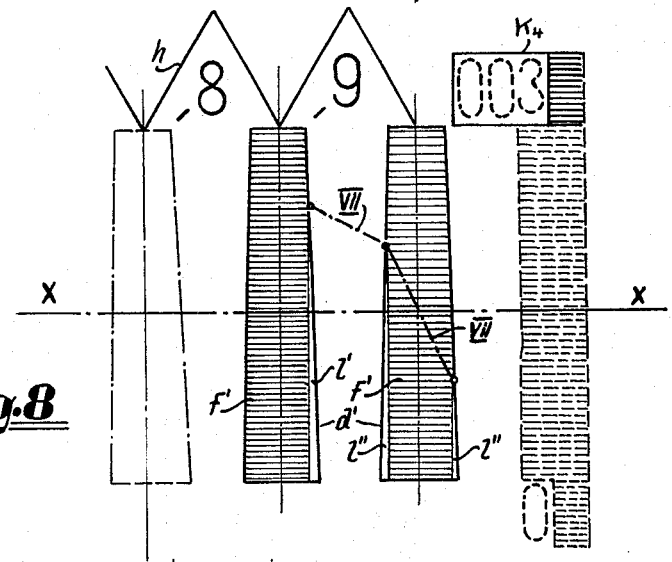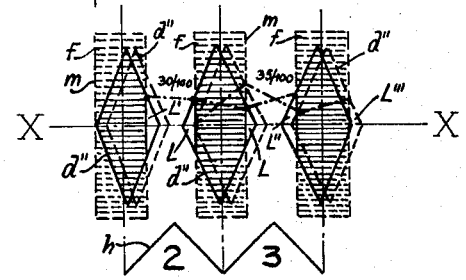

… … …

United States Patent Office

2,959,862
Patented Nov. 15, 1960

2,959,862
MICROMETER GAUGE

Ernst Jager, Bahnstrasse 368, Kleinostheim, near Aschaffenburg, Germany

Filed May 6, 1958, Ser. No. 733,298

Claims priority, application Germany May 6, 1957

16 Claims. (Cl. 33—143)

The present invention relates to a micrometer gauge, for measuring or controlling linear dimensions of workpieces, comprising a fixed part and a sliding part enclosing said fixed part, each part terminating in one half of a measuring jaw. The fixed part is provided with a main scale showing the integers (hundreds, tens, units). One part is provided with markings in the form of lines or slots, whilst the other part has bar-like markings, hereinafter referred to as "bars," the two sets of markings being inclined to each other and at least one set inclined relatively to the direction of movement.

Such measuring instruments are known in themselves, but they all have, however, the disadvantage that the relatively inclined parallel line markings and parallel bars respectively on the two parts necessitate a relatively great height of the instrument normal to the direction of sliding; for the enlargement necessary for an accurate reading in the direction normal to the direction of sliding can only be obtained if the angle between the bars and the line markings is a very acute angle. On the other hand if this angle is reduced, the clear visibility of the points of intersection between the bars and line markings is decreased so that below a certain angle the reading becomes indistinct.

For this reason, in one known form of such measuring instruments, which is only usable for comparative measurements, mechanical enlarging means are employed, such as a lever transmission. In another known micrometer gauge, in which a reading of the smallest dimension to be measured is taken at intersecting oblique lines of two scales which run in the same direction and are inclined to each other, transparent parts are required which may be moved relatively to each other. In this case, enlarging for facilitating the reading is accomplished in such a way that the shadow movement of the points of intersection visible in the transparent part is several times the amount of the main sliding movement. However, owing to lack of sharp definition of the shadow the accuracy of the measurement is insufficient.

According to the present invention the disadvantages of the known micrometer gauges are eliminated by making the markings on one of the relatively slidable parts in the form of side edges of figures, hereinafter referred to as "windows," such side edges being constantly or variably inclined to a datum line in the direction of sliding, whilst the centre line of a window normal to such datum line constitutes a line of symmetry for the parts of the side edges which are relatively inclined as mirror images of one another. The markings on the other part are in the form of straight parallel side edges of figures normal to such datum line, hereinafter referred to as "bars". The sets of marking edges cooperate with one another on relative sliding of the two parts in such a way that at a point corresponding to the distance between the two halves of the measuring jaw and associated with a digit on a main scale graduated in integers (for example whole millimetres) and with a digit on a further scale graduated in the next smaller unit (for example tenths of a millimetre), measuring diagrams are developed which according to the measure of the smallest unit (for example hundredths of a millimetre) are differently formed from (three) acute-angled similar triangles, whose apex angles are each defined by the edge of a bar and the edge of a window, the particular shape of the appropriate individual measuring diagram representing the digit of the smallest unit, and the distances of the marking edges, that is the apices of the triangles, from the datum line giving an enlarged indication of the relative movement of the two parts for the smallest unit (for example a hundredth of a millimetre).

In the preferred constructional form of the invention the windows are in the form of elongated trapezoidal figures each with one of the parallel sides of the trapezoid as base or correspondingly arranged trapezoidal slots in the sliding part, the line of symmetry of each trapezoid lying parallel to the side edges of the generally rectangular bars.

In another constructional form, which is convenient when less importance is placed on exact reading of the smallest unit and a quick optical reading by a vernier of, say, a tenth or a twentieth of a millimetre will suffice, each window is in the form of a rhombus which is symmetrical with respect to the datum line with two corners on such datum line. In this case, in cooperation with the bars above and below the datum line, triangles are formed which constitute the measuring diagrams and allow a quick reading, wherein in the decimal system if the scale on the sliding part is graduated in tenths of a millimetre, a scale position corresponding to exact tenths of a millimetre shows above the datum line two congruent triangles whose apices lie on a parallel to the datum line and likewise below the datum line two further such triangles. The same occurs for the case of a twentieth of a millimetre, the triangles however being higher and broader and not in one and the same window but in neighbouring windows.

Obviously, bars and windows can be interchanged, the windows being on the fixed part and the bars on the sliding part, since it is only the relative sliding of the parts which matters, one of the parts engaging around the other, wholly or partially, after the manner of the cursor of a slide rule, or being guided in the other after the manner of the slider of a slide rule.

For simplicity, reference is made in the following only to the preferred constructional form of the invention, namely that with trapezoidal windows. It is, however, to be remembered that these windows can also be of other elongated shapes extending on both sides (preferably acutely) from their axes of symmetry lying normal to the datum line, and thus may for example each be in the shape of a lens or a rhombus or a lozenge or in the simplest case with less measuring accuracy a circle, such shapes cooperating in the manner described with generally rectangular bars.

In the case of trapezoidal windows (and similarly with rhombus-shaped windows) the position of the apex of the triangle constituting the measuring diagram moves, with longitudinal movement of the sliding part, normally to the direction of sliding in such a manner that on moving the sliding part say one hundredth part of a millimetre the upper triangle apex on the one trapezoid edge moves downwardly by just as much from the trapezoid centre line parallel to the parallel trapezoid edges, as the upper triangle apex at the other trapezoid edge moves upwardly from such centre line. The ratios can for example be so chosen by appropriate inclination of the edges of the trapezoidal windows that the triangle apices move fifty times as much in the direction normal to the direction of sliding as the sliding part. The triangle apices thus separate at a hundred times the rate of such sliding—for example 10 millimetres for one-tenth of a millimetre. The height of the sliding part then needs with otherwise equal proportions and equal reading accuracy to be only half as large as with known micrometer gauges without requiring any mechanical transmission devices. Since the micrometer gauge according to the invention does not operate with broad shadow bands, the angle between the trapezoid side edges and the bar side edges can be chosen relatively large, so that the intersection points of these edges are sharply defined, thus making possible more accurate measurements of small units than hitherto.

The following is a description of a preferred embodiment of the invention with reference to the accompanying drawings wherein:

Figure 1 is a side elevation of the micrometer gauge according to the invention in which the two superimposed parts are in the position for zero measurement in which the two halves of the gauge are in contact with each other.

Figure 2 is a side elevation of the so-called fixed part of the micrometer gauge as shown in Figure 1.

Figure 3:
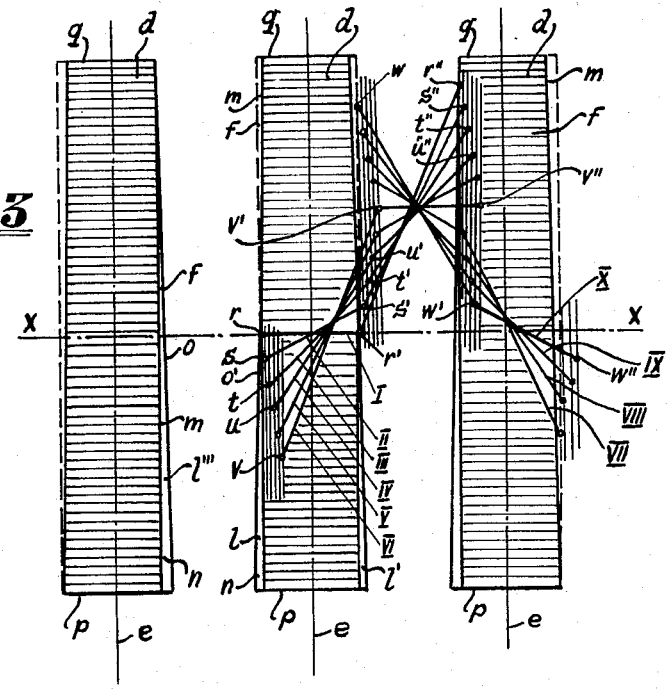

Figure 3 shows three adjacent trapezoidal windows of the upper row of windows in the sliding part of Figure 1 on a ten times enlarged scale, the centre window being in the zero measuring position I (for zero hundredth) relatively to a so-called bar of the fixed part according to Figure 2, whilst for this centre window and the adjacent window on the righthand side the measuring positions and measuring diagrams II to X (for measurements which are greater than in position I by one hundredth up to nine hundredths) in relation to the same bar, are diagrammatically indicated on a hundred times enlarged scale in the direction x—x.

Figure 4:
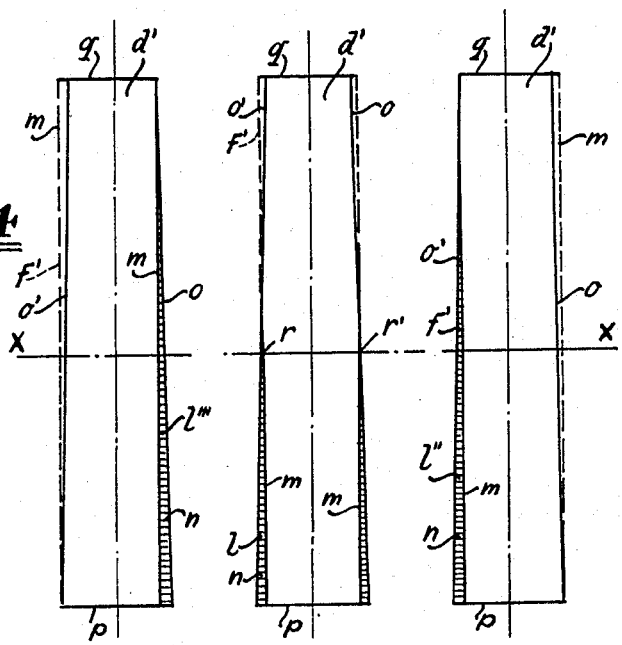

Figure 4 shows the trapezoidal windows of the second row of windows arranged on both sides of the same axes of symmetry of the windows according to Figures 1 and 3 normal to the direction of sliding, for a zero position (I) of the centre window.

Figure 5 shows diagrammatically side by side the measuring diagrams I to X according to Figure 3, Figure 6 is another diagrammatic illustration of the measuring diagrams I to X of Figures 3 and 4, Figures 7 and 8 respectively show measuring positions corresponding to Figures 3 and 4, for 8.09 mm. and 3.96 mm. respectively, and Figure 9 is a measuring diagram corresponding to that of Figure 3 for rhombic windows.

According to Figures 1 and 2 the micrometer gauge consists substantially of two parts $a$ and $c$. For simplicity, the first part $a$ is referred to as the fixed part, whilst the second part $c$ is referred to as the sliding part. Part $a$ carries at one end one half $b$ of the measuring jaw $b$, $b'$, while the sliding part $c$ at the corresponding end carries the other half $b'$ of the measuring jaw and surrounds, after the usual manner of a slide rule, the measuring portion of part $a$, which is shown partly broken off and shortened, so that it can be moved parallel to itself along said measuring portion. Measurement of the length or thickness of a workpiece is effected between the exactly parallel and parallel-guided measuring surfaces of the halves $b$ and $b'$ of the measuring jaw which face one another and between which the workpiece or the like to be measured is introduced.

In the portion of the sliding part $c$ surrounding part $a$ two rows of trapezoidal indicating means are provided in the form of cutouts, one above the other parallel to the direction of sliding; in the embodiment shown each row consists of 21 windows which in the upper row are designated $d$ and in the lower row are marked $d'$. The longitudinal axes of the elongated trapezoidal slots coincide with the axes of symmetry $e$ with respect to each of which a pair of windows $d$ in the upper row and $d'$ in the lower row are symmetrically arranged. For clearness two windows only are shown at the measuring end of the sliding part $c$ and two further windows at the other end of the sliding part $c$ in each row, the remaining windows (not shown) being symmetrically arranged about the lines of symmetry $e$.

The windows $d$ and $d'$ permit viewing of two corresponding parallel rows of bar-like indicating means $f$ and $f'$ respectively, which are provided on the fixed part $a$ and hereinafter termed "bars." In the illustrated embodiment 22 first indicating means or "bars" cooperate with 21 second indicating means or "windows," which may be expressed as $(10n+2)$ first indicating means and $(10n+1)$ second indicating means, wherein $n$ is an integer. The main portions of the first indicating means, the ends of which project somewhat beyond the parallel narrow edges of the trapezoidal windows, are rectangular. The bars $f$ of the upper row are staggered relatively to the bars $f'$ of the lower row as shown in Figure 2. The distance between the axes of symmetry $e$ of the windows $d$, $d'$ is one-tenth of a millimetre less than twice the width of a bar $f$ or $f'$. In the present embodiment the bars, shown in the drawings on an enlarged scale, have a width of 2 millimetres and the distance between their longitudinal edges is 2 millimetres. Thus the distance between the axes of symmetry $e$ in this embodiment is on a correspondingly enlarged scale 3.9 mm. The trapezoidal width along the line x—x is 2 mm., its base $p$ is 2.20 mm. and the upper trapezoidal edge $q$ is 1.78 mm. The windows have the shape of isosceles trapezoids.

On the sliding part $c$ the numerals 0 to 9 are marked twice between the rows of windows $d$ and $d'$ along a zigzag line, the lower teeth of which respectively lie on the axes of symmetry $e$ while the upper teeth lie midway between such axes of symmetry. The two rows of numerals 0 to 9 thus form a scale $h$ associated respectively with the two rows of windows and bars, for reading measurement units of $\frac{1}{10}$ mm., by which the size of a workpiece to be measured exceeds an integral millimetre measurement.

This $\frac{1}{10}$ mm. scale is associated with a main scale for integers or integral millimetre measurements, the numerical graduations of which are provided on part $a$ in four rows in the direction of sliding, namely, one row at the level of a window $k_1$ for the numerals 0, 4, 8, 12 . . . etc., a second row at the level of a window $k_2$ for the numerals 1, 5, 9, 13 . . . etc., a third row at the level of a window $k_3$ for the numerals 2, 6, 10, 14 . . . etc., and a fourth row at the level of a window $k_4$ for the numerals 3, 7, 11, 15 . . . etc., the windows $k_1$ to $k_4$ forming apertures in the surrounding portion of the sliding part $c$. The numerals of the four-row main scale which for clearness are not shown in Figures 1 and 2, alternate with one another in such a manner that one numeral, regardless of whether it consists of one or two or three digits (for example 008 as shown in Fig. 7), will always appear in one of the windows $k_1$ to $k_4$ indicating the millimetre measurement of the workpiece, to which integer tenth and hundredth millimetres must be added which are read in the following manner. The numerals of the main scale appear in recesses $i$ at the upper or lower ends, respectively, of the bars $f$ and $f'$. The spaces between the bars are marked in Figure 2 in the upper row with $g$ and in the lower row with $g'$. Furthermore, in Figures 2 to 4 the longitudinal side edges of the bars are marked $m$, the trapezoidal side edges of the windows $d$ and $d'$ are marked $o$ (on the righthand side) and $o'$ (on the lefthand side) and the parallel trapezoidal edges of the windows are marked $q$ at the top and $p$ at the bottom. In the zero position (when the parts $b$ and $b'$ of the measuring jaw are in contact) the axis of symmetry $e$ of the first window $d$ exactly coincides with the centre of the first bar $f$, as shown in Figure 3, in the centre window. If a workpiece of $\frac{1}{10}$ mm. thickness is being measured, the third bar $f$ will appear in the second window $d$ exactly symmetrically with respect to the centre line $e$ thereof so that here again, somewhat to the lefthand side, at the numeral 1 of the scale $h$ the centre picture of Figure 3 will appear.

When the workpiece to be measured has a size only comprising whole millimetres and additional exact tenth millimetres or zero whole millimetres and exact tenth millimetres, without hundredth millimetres being added thereto, then one or other of two conditions will arise.

In one condition, in one of the upper windows $d$ of the sliding part $c$ a bar $f$, according to the horizontally shaded part of the centre window in Figure 3, will appear in such a manner that the trapezoidal sides $o$ and $o'$ of the window intersect the horizontal centre line $x$—$x$ at the same points at which they also intersect the long sides $m$ of the rectangle (the common horizontal centre line of all bars is hereinafter named zero line $x$—$x$). Consequently, in the trapezoidal centre window of Figure 3, on both sides of the bar $f$, which in Figures 1 and 2 is marked in full black, and below the line $x$—$x$, two congruent acute-angled triangles $l$ and $l'$ will appear, the apices of which are on the zero line $x$—$x$ and the bases of which coincide with the base line $p$ of the window $d$. (These triangles $l$—$l'$ constitute the marginal portions $n$ of the trapezoidal window $d$ which in this case extend past the edges of bar $f$).

In the other of the two conditions above mentioned, there will appear on the lower scale what is shown in the centre, window $d'$ of Figure 4. In this case, two adjacent bars $f'$ appear only at the lower marginal portions $n$ of the trapezoid, so that below the zero line $x$—$x$ congruent triangles $l$—$l'$ are again produced which, however, in this case form part of the black marking of the bars $f'$ between the trapezoidal side edges $o, o'$, the apices of the triangles $l, l'$ lying on the zero line and the bases thereof coinciding with the base line $p$ of the lower trapezoidal window $d'$.

If thus the conditions either of the centre window of Figure 3 or of that of Figure 4 appear in one of the windows $d$ or $d'$, then the size of the workpiece may be read with exact tenth millimetres (since in this case it does not have additional hundredth millimetres). Thus, the whole millimetres will be displayed in one of the windows $k_1$ to $k_4$, and the additional tenth millimetres can be read off at that point of the scale $h$ which is positioned below or above the space $g$ or $g'$ respectively between the two windows ($d$ or $d'$) showing the proper pattern described with reference to Figs. 3 and 5. In this case, the measuring diagram I is obtained in form of a line leading from the apex $r$ of the triangle $l$ on the zero line to the apex $r'$ of the triangle $l'$ and then to the point $r''$ which is on the lefthand side $m$ of the bar in the upper portion of the adjacent window on the righthand side in Figure 3 (see Figures 3 and 5). This point $r''$ is the point of intersection between such bar side and the lefthand trapezoidal side $o'$ in the adjacent window $d$ on the righthand side, the marginal portion $n$ of the window forming an acute-angled triangle, with sides $m$ and $o'$ and base $p$, which is not filled by the bar $f$. The same measuring diagram I is obtained in the case of the centre picture of Figure 4, wherein for reasons of clearness only the points $r$ and $r'$ of the measuring diagram on the zero line $x$—$x$ are indicated. The measuring diagram I thus applies to the case when the size of the workpiece is exactly in tenth millimetres without additional hundredth millimetres. The picture on the lefthand side of Figure 3, or of Figure 4, shows the conditions appearing in this case in the adjacent window on the lefthand side of the aforementioned measuring window, wherein according to Figure 3 the bar $f$ on its righthand side forms an acute-angled triangle $l'''$ with its base at $p$ and its apex at $q$ and on its lefthand side forms a congruent acute-angled triangle with its base at $q$ and its apex at $p$. On the other hand, in the window adjacent to the centre measuring window of Figure 4 on the lefthand side thereof, the triangle $l'''$ is covered by the bar $f'$ located behind and to the right of the side $o$ of such window. The bar $f'$ behind and to the left of the trapezoidal side $o'$ of the righthand window in Figure 4 forms a congruent acute-angled triangle $l''$.

The centre picture of Figure 3 shows diagrammatically—and on a scale enlarged 100 times in the direction $x$—$x$—in the measuring diagrams II to VI and VII to X those cases in which the dimension to be measured differs by one to nine hundredths from the dimension of the measuring diagram I in exact tenths. For example, if the workpiece is one hundredth greater than the dimension according to measuring diagram I, in the centre picture of Figure 3 (or correspondingly in the centre picture of Figure 4) the bar $f$ (or each of the bars $f'$) is moved by one hundredth relatively to the centre window, so that for example in the centre picture of Figure 3, the lefthand bar side $m$ intersects the lefthand trapezoidal side $o'$ at a point $s$ which is located somewhat below the zero line $x$—$x$, while the righthand side $o$ of the trapezoidal window intersects the righthand bar side $m$ at a point $s'$, which is located at the same distance above the zero line $x$—$x$ as the point $s$ is located below such line. Thus, in the case of a sliding movement of one hundreth of a millimetre, the apex of the triangle $l$ moves down below the line $x$—$x$ by the same amount as the apex $s'$ of the triangle $l'$ moves up above the line $x$—$x$. In the same way the triangle $l''$ in the righthand picture of Figure 3 is shortened to a point of intersection $s''$ of the lefthand bar side $m$ with the lefthand trapezoidal side $o'$. Joining up the points $s, s'$ and $s''$ results in a line as shown in Figure 3, so that the measuring diagram II of Figure 5 corresponds to a workpiece size exceeding exact tenths by one hundredth.

If the workpiece size exceeds exact tenths by two hundredths a further movement of the bars $f$ to the right will result in points of intersection of the bar sides $m$ with the trapezoidal sides $o', o$ at $t, t'$ and $t''$. Joining up these points of intersection will give the measuring diagram III for two hundredths.

For a workpiece size exceeding exact tenths by three hundredths, a corresponding measuring diagram IV consisting of the line joining the points $u, u'$ and $u''$ is obtained.

In the same way the measuring diagram V corresponds to a workpiece size exceeding exact tenths by four hundredths, measuring diagram VI to a size of an additional five hundredths, measuring diagram VII to a size of an additional six hundredths, measuring diagram VIII to a size of an additional seven hundredths, measuring diagram IX to a size of an additional eight hundredths and measuring diagram X to a size of an additional nine hundredths (see Figures 3 to 5). It will be noticed that the measuring diagram VI connecting points $v, v'$ and $v''$ includes a horizontal line between points $v'$ and $v''$, parallel to the zero line $x$—$x$, and that for the following hundredth a point of intersection with the lefthand bar side is obtained on the lefthand trapezoidal side $o'$ of the adjacent window $d$ on the righthand side, due to the relative dimensions chosen. Accordingly, the measuring diagrams VII to X in Figure 3 and in Figure 4 respectively will begin at the point of intersection of the righthand bar side $m$ and the righthand trapezoidal side $o$ of the centre window and lead to the point of intersection of the lefthand bar side $m$ with the lefthand trapezoidal side $o'$ of the righthand window and then to the point of intersection of the righthand bar side $m$ with the righthand trapezoidal side $o$ of the righthand window. Thus, for example, the measuring diagram X (for nine hundredths) consists of the line $w, w'$ and $w''$.

For measuring the size of a workpiece which is inserted between the two halves of the measuring jaw $b$ and $b'$, that window on the sliding part $c$ must be found in which according to Figures 3, 4 and 5 one of the measuring diagrams of I to X is shown, in which the apices of the triangles $l$ or $l'$ or $l''$ have the same distance respectively below or above the zero line $x$—$x$. If the measuring diagrams according to Figure 5 have previously been memorised or if they are indicated on a part of the micrometer gauge not shown, it is easy to find the measuring diagram associated with a given workpiece size. Locating this diagram is facilitated by the fact that for an exact tenths measurement without additional hundredths according to measuring diagram I as well as for a measurement having an additional five hundredths, the lefthand or righthand branch of the measuring diagram will coincide with or be parallel to the zero line. Even if the measuring diagram is incorrectly identified, the error can hardly be greater than a half-hundreth of the real size. The determination of the correct trapezoidal window and the correct measuring diagram may further be facilitated by a diagrammatic representation of the position of the apices of triangles $l$, $l'$, $l''$, according to Figure 6. In this figure, the end-points of the first two vertical lines indicate for each of the measuring diagrams I to VI the positions of the apices of the triangle $l$ and $l'$, respectively, and the third vertical line defines the position of the apex of the triangle $l''$, while the base line corresponds to the trapezoidal base $p$. In a similar manner, in Figure 6, for the measuring diagram VII to X, the endpoints of the first two verticals define the positions of the apices of the triangles $l'$ and $l''$ above the zero line x—x and the endpoint of the third line defines the position of the endpoint of the particular measuring diagram (e.g. $w''$ for the measuring diagram X).

If in this way, the measuring diagram appropriate to the workpiece size, either in the upper row of windows $d$ or in the lower row of windows $d'$, has been identified, it only remains to read the dimension in whole millimetres displayed in one of the windows $k_1$ to $k_4$, and to read the additional dimension in tenths of a millimetre at the corresponding point of the scale $h$, and then to add the number of hundredths of a millimetre which corresponds to the measuring diagram which has been identified.

Figures 7 and 8 respectively show two examples of particular measurements namely 8.09 mm. in Figure 7 and 3.96 mm. in Figure 8. Since in the window $k_1$ of the main scale the numerals 0, 4, 8, 12 etc. will appear, numeral 8 must appear in window $k_1$, i.e. in the left half of the second row of the whole millimetre numerals of the main scale, and the measuring diagram for 8.09 mm. must also appear in the left half of the upper row of the trapezoidal windows. Now, in this row, that measuring diagram is sought in which the apices of three successive acute-angled triangles not covered by the bars $f$ in the trapezoidal windows $d$ (in this case triangles $l'$, $l''$, $l'''$) are progessively lower from left to right, that is the apex of the triangle ($l'$) on the left is the highest one, the apex of the next triangle ($l''$) to the right is somewhat lower and the apex of the next triangle ($l'''$) to the right is the lowest one. This measuring diagram will be found, in the case of the measurement 8.09 mm., in the first window of the upper row of windows, as may be seen in Figure 7, because in this example the first decimal is zero, i.e. the respective measuring diagram is located above the scale $h$ at that triangle apex including the numeral zero. As may be seen, this measuring diagram complies with the aforementioned condition for the triangles $l'$, $l''$, $l'''$, with the apex $w'$ of the triangle $l''$ positioned the same distance above the zero line x—x as the apex $w''$ of the triangle $l'''$ is positioned below the zero line x—x, whilst the apex $w$ of the triangle $l'$ is positioned above $w'$ and $w''$. The dash-dotted connecting lines of the apices $w$, $w'$, $w''$ show the measuring diagram X of Figures 3, 5 and 6, and thus correspond to the measurement of 9/100. Finally, after identifying this measuring diagram, it is readily possible to read the numeral 8 in the window $k_1$, the numeral 0 on the scale $h$ and the hundredths digit by the measuring diagram in connection with Figures 5 or 6. In this case the bar $f$ shown in the first trapezoidal window is the third bar of the first row of bars provided on the fixed part $a$, whereas the first two bars of this row are invisible above the window $k_1$ as may be seen in Figure 7. Numeral 8 is in this case provided in the recess $i$ at the lower end of bar $f$, whilst the numerals 7 and 1 provided in the recesses $i$ at the upper end of the first and second bar are invisible.

When, say, a dimension of 9.09 mm. is to be measured, the appropriate measuring diagram, in which the apices of three adjacent triangles $l$, $l'$, $l''$ or $l'$, $l''$, $l'''$ in this succession are in progressively lower positions in relation to base $p$, would appear in the right half of the first row of trapezoidal windows above the numeral zero of the second row of numerals 0 to 9 on the scale $h$ and the numeral 9 will appear in the window $k_2$. Further, for reading the hundredths by means of the measuring diagram of Figure 7, corresponding conditions would result.

As a further example, Figure 8 shows the measuring diagram for a measurement of 3.96 mm., which can only appear in the right half of the lower row of windows provided on the fixed part $c$ and is found below the last numeral 9 of the scale $h$ at the last two trapezoidal windows $d'$ preceding the window $k_4$. Numeral 3 will appear in the window $k_4$. The measuring diagram as determined again complies with the condition that the apices of the triangles $l'$, $l''$, $l'''$ (which also in this case are not covered by the corresponding rectangle sides and thus left free) are in progressively lower positions. Joining up these apices gives the measuring diagram VII which according to Figures 3, 5 and 6 correspond to a measurement of 9/100.

It is not necessary for the windows $d$, $d'$ to be provided in two rows on the sliding part $c$ one below the other. This arrangement has only been chosen to provide a relatively short sliding part $c$, for example, of the order of 85 to 90 mm., whereas a sliding part with the windows arranged in one row only would have a length of about 160 to 170 mm., which corresponds to the provision of two rows of trapezoidal windows $d$ and $d'$, each with a mean width of 2 mm. and with separations each of 1.9 mm. Thus the lower row of windows $d'$ could be omitted and placed instead to form an extension of the upper row of windows $d$ on a correspondingly lengthened sliding part $c$. Of course, also one window $k_1$ or $k_2$ and/or $k_3$ or $k_4$ is sufficient for a short length of the micrometer if numerals consisting of two or three digits can be provided within the available width of the windows. The conditions chosen for this example depend on the fact that the tenth-scale $h$ comprises numerals 0 to 9 only twice if two rows of windows are provided, whereas if only one row of windows is provided these numerals must be shown four times on the scale.

The relative sizes chosen for the example are, of course, not essential for carrying out the invention, provided that the separations between the lines of symmetry $c$, about which the trapezoidal windows are located, bear a suitable ratio to the separations between the left or right sides of the bars so that a reading of one hundredth or—if less accurate measuring is permitted—several hundredths of the dimension is obtained in the above-described manner by means of the measuring diagrams. The ratio between the horizontal movement in the direction of sliding of the sliding part $c$ and the associated change in height of the apices of the triangles, as described in connection with Figures 3 and 6, need not therefore be 1:50 as in the present embodiment but may be otherwise chosen. These dimensions may, for example, also be chosen to suit the duodecimal system, i.e. 1/10 English inch, 1/100 inch and 1/1000 inch.

It will also be clear that the windows $d$ and $d'$ of the sliding part $c$ need not be arranged with their greater parallel side $p$ at the bottom, but may also be arranged inversely thereto, namely with the smaller parallel side $q$ at the bottom. This will result in a symmetrical change of the branches of the measuring diagrams shown in Figures 3 and 4 below the zero line $x$—$x$ into the zone above the line $x$—$x$.

It is, of course, not essential for the bars $f$ and $f'$ to be marked in a dark colour, as shown in the drawings, against the light-coloured windows on the sliding part $c$. It is sufficient if by means of a suitable colour effect or the like any contrast between the side edges of the windows and the bars and the triangles between them is obtained. The black and white arrangement shown has the advantage that the value to be measured of the smallest measurable unit, for example hundredths of a millimetre, will always appear in the region of the bars marked in dark, these bars at the same time also serving to attract the eye. The sliding part or the fixed part or both may be made black over the whole measuring range, with the exception of the spaces between the bars or the spaces between the window edges.

The windows $d$ and $d'$ of the sliding part $c$ need not be formed by apertures in the enclosing plate of the sliding part $c$. If this plate, for example, is made of opaque material, for example opaque synthetic resin, then it is sufficient if the side edges only of the windows are marked on the sliding part $c$ (for example are transparently etched), in such a manner that their points of intersection with the bar edges $m$ may be located on the fixed part $a$ when looking through. It is also sufficient if the bars are indicated, not as coloured or otherwise contrasted markings, but in the form of engraved lines $m$ on the part $a$.

As above mentioned, the term "window" as used herein and in the appended claims is not restricted to the preferred trapezoidal windows, but also includes other shapes whose side edges form with the bars acute-angled triangles or triangle-like figures which permit the measuring diagrams according to the invention to be determined for the smallest values to be measured. For example, Figure 9 shows the measuring diagram which is obtained when, instead of the trapezoidal windows $d$, $d'$, rhombic windows $d''$ are provided on the sliding part $c$. Like Figure 3, Figure 9 shows in full lines a position of the windows $d''$ in which the value to be measured, for example $30/100$, is greater than an integral number of millimetres. In such case, the bars $f$ on both sides of their edges $m$ at the centre window leave free two congruent triangles L, each extending above and below the datum line $x$—$x$, and further in each of the adjacent windows on the lefthand and righthand sides leave free one greater triangle L' or L'', these triangles being congruent and mirror images of one another. The measuring diagram is characterised by the dash-dotted line marked $30/100$, leading from the upper apex of the triangle L' to the upper apices of the triangles L and then to the upper apex of the triangle L'', the centre branch of this line being horizontal. This measuring diagram is readily identifiable when viewing the row of windows and is associated with the numeral 3 of the scale $h$.

The rhombic windows $d''$, indicated in broken lines, are in a position in which they are moved five hundredths from the position shown in full lines. In this case, the triangle L' extending on both sides of the zero or datum line $x$—$x$ has become greater, whilst the triangle L'' also symmetrical with respect to the line $x$—$x$ has become smaller. The triangles L on the two sides $m$ of the bar $f$ at the centre window have now become triangles of different size, the triangle on the lefthand side being much smaller than that on the right hand side. The upper apex of the lefthand triangle L is shown joined by a broken line to the upper apex of the righthand triangle L and thence to the upper apex of the adjacent triangle L'' next thereto and further to the upper apex of the righthand triangle L'''. This line represents the measuring diagram for a position of the sliding part $c$ corresponding to a measuring value exceeding an integral millimeter by $35/100$. The centre branch of the line marked $35/100$ should, in actual fact, lie parallel to the zero or datum line $x$—$x$ and it appears inclined in the drawing only for the reason that it is impracticable to illustrate in this drawing so small a movement as $5/100$ mm. from the position shown in full lines. Thus, also for intermediate values of $5/100$ mm., a characteristic measuring diagram can readily be identified on the sliding part by its horizontal centre branch and is to be associated with the numeral of the scale appearing beneath it.

This embodiment, which is suitable for quick approximate measurements, is not intended for measurement of intermediate values between zero and five hundredths and between five hundredths and ten hundredths, but such values can still be estimated in accordance with the movement of the measuring diagram or with the changes of the triangles L, L', L'', L'''.

Finally, it is not necessary for the relatively movable micrometer parts $a$ and $c$ to be formed of flat plate-like members. For example, the part $c$ may be in the form of a hollow cylinder sliding upon a corresponding cylinder or hollow cylinder $a$ mounted within it. In this modification, the outer hollow cylinder is provided with the trapezoidal windows and the inner cylinder with the bars cooperating therewith. The inner hollow cylinder and the outer hollow cylinder may be made of transparent material and the inner hollow cylinder may be provided with lighting equipment, for example, with an electric lamp energised from a dry battery. This will give an improved contrast effect between the bars and the window edges and will facilitate the reading.

The micrometer gauge according to the invention is not restricted to measuring lengths or thicknesses, but may advantageously also be used for measuring other physical values, such as pressures and temperatures, which may be converted into a relative longitudinal movement of the micrometer parts $a$ and $c$. In the case of pressures, one of the relatively movable parts could be provided with a pressure piston or diaphragm, which causes movement relative to the other part in accordance with the pressure values on a chosen scale. In the case of temperature measurement, the values to be measured can be converted, for example by the thermal expansion of a metal rod or the like, into a linear movement of one of the parts $a$ and $c$. The micrometer gauge according to the invention may also be used, in this or a similar manner, as a control member in a thermostatic apparatus for maintaining constant a fixed or, if desired, adjustable temperature determined by one of the relatively slidable parts $a$ and $c$, the scales on the micrometer parts in this case of course being graduated, not in millimetres but in degrees of temperature. In the same way, it is possible, in other embodiments of the invention, to graduate and calibrate and scales directly in the appropriate units for pressures or other physical quantities measured by relative movement of the parts $a$ and $c$.

What I claim as my invention and desire to secure by Letters Patent is:

1. Measuring instrument comprising a first part and a second part connected to each other for relative movement in one direction, said first part having at least one row of first indicating means and said second part having at least one row of second indicating means, said rows extending in said direction and being superimposed on each other, each first indicating means including a pair of parallel first lines extending perpendicular to said direction and being spaced equal distances in said direction, and each second indicating means including a pair of second lines inclined to each other and to said direction and respectively defining the same angle with said direction and being oppositely inclined to lines of symmetry extending between each pair of second lines perpendicular to said direction, the distances between said parallel first lines of said first indicating means being equal to the distance between two intermediate points of said two second lines of said second indicating means, all said intermediate points being aligned along a reference line extending in said one direction and said lines of symmetry being spaced distances different by the same fraction of a measuring unit from said distance between said first lines, so that three second lines of two adjacent second indicating means intersect with three first lines of two adjacent first indicating means at three points in the region of said reference line defining two lines angularly spaced at different angles and respectively characteristic for and representing a different fraction of the measuring unit; and graduations and indicia on one of said parts for indicating said measuring units and respectively located in the regions of said second indicating means so that said indicia indicate the respective measuring unit, where the pattern of the three points of intersection indicates a specific fraction of the measuring unit.

2. A measuring instrument as set forth in claim 1, wherein said first and second lines are straight lines, said straight second lines of one second indicating means defining a pair of triangles with said first lines of a cooperating first indicating means, and one straight second line of an adjacent second means defining a triangle with a first line of the respective adjacent first indicating means, each of said triangles having an acute angle, and the apices of said triangles at said acute angles constituting said three points of intersection.

3. A measuring instrument as set forth in claim 1, wherein said second indicating means are windows in said second part, said windows having the outline of isosceles trapezoids.

4. A measuring instrument as set forth in claim 1, wherein each first indicating means has a colored portion bounded on two sides by said first lines.

5. A measuring instrument as set forth in claim 1, wherein said second indicating means are symmetrical rhombuses, said rhombuses being symmetrical to a line extending in said direction parallel to said reference line.

6. Measuring instrument comprising a first part and a second part connected to each other for relative movement in one direction, said first part having two parallel rows of first indicating means extending in said direction and said second part having two parallel rows of second indicating means respectively superimposed on said rows of first indicating means, and said first indicating means of said two rows being staggered to each other equal distances, each first indicating means including a pair of parallel first lines extending perpendicular to said direction and being spaced equal distances in said direction, and each second indicating means including a pair of second lines inclined to each other and to said direction and respectively defining the same angle with said direction and being oppositely inclined to lines of symmetry extending between each pair of second lines perpendicular to said direction, the distances from said parallel first lines of said first indicating means being equal to the distance between two intermediate points of said two second lines of said second indicating means, all said intermediate points being aligned along a reference line extending in said one direction and said lines of symmetry being spaced distances different by the same fraction of a measuring unit from said distance between said first lines, so that three second lines of two adjacent second indicating means intersect with three first lines of two adjacent indicating means at three points in the region of said reference line defining two lines angularly spaced at different angles and respectively characteristic for and representing a different fraction of the measuring unit; and graduations and indicia on one of said parts for indicating said measuring units and respectively located in the regions of said second indicating means so that said indicia indicate the respective measuring unit, where the pattern of the three points of intersection indicates a specific fraction of the measuring unit.

7. A measuring instrument as set forth in claim 6, wherein each row of first indicating means has $10n$ plus 2 first indicating means, and each row of second indicating means has $10n$ plus 1 second indicating means wherein $n$ is an integer, and wherein the axes of symmetry of said second indicating means are spaced a distance 0.1 mm. smaller than twice the distance between two first lines, wherein said first lines are spaced from each other 2 mm.

8. A measuring instrument as set forth in claim 6, wherein each first indicating means is colored between the respective two first lines with a color different from the color between two adjacent first lines of two adjacent first indicating means, and wherein said second indicating means are windows partly bounded by edges corresponding to said second lines.

9. A measuring instrument as set forth in claim 6, wherein said graduations are formed by zig-zag lines having alternate points pointing respectively at spaces between adjacent second indicating means of one row, and at the lines of symmetry of the second indicating means of the other row of second indicating means.

10. A measuring instrument as set forth in claim 6, wherein said first indicating means are areas of contrasting colors bounded on two sides by said first lines, each area having recessed portions, indicia numerals in said recessed portions for indicating digits of at least one higher order than the order of said measuring unit; and wherein said second part is formed with cutouts located over different indicia numerals in relatively displaced positions of said first and second parts.

11. A measuring instrument as set forth in claim 10, wherein each said area has two recessed portions for two indicia nuumerals so that four rows of indicias are provided extending parallel to said direction and wherein said second part has four cutouts, each cutout being associated with one of said rows of indicia numerals.

12. A measuring instrument as set forth in claim 6, wherein at least said first lines are engraved in said first part.

13. A measuring instrument as set forth in claim 6, wherein said first and second lines have such length that only three points of intersection are formed along said rows of first and second indicating means.

14. A measuring instrument as set forth in claim 6, wherein said first indicating means are bars bounded by said first lines on two sides, and wherein said second indicating means are trapezoidal windows bounded on two sides by edges corresponding to said second lines, and bounded on the other two sides by parallel edges, said parallel edges being spaced from each other such a distance that along said rows of windows only a single group of said three points of intersection is visible through said windows.

15. Measuring instrument comprising a first part and a second part connected to each other for relative movement in one direction, said first part having at least one row of indicating bars and said second part having at least one row of indicating windows, said rows extending in said direction and being superimposed on each other, each indicating bar being partly bounded by a pair of parallel first lines extending perpendicular to said direction and being spaced equal distances in said direction, and each indicating windows being partly bounded by a pair of second lines in the form of edges inclined to each other and to said direction and respectively defining the same angle with said direction and being oppositely inclined to lines of symmetry extending between each pair of second lines perpendicular to said direction, the distances between said parallel first lines of said indicating bars being equal to the distance between two intermediate points of said two second lines of said indicating windows, all said intermediate points being aligned along a reference line extending in said one direction and said lines of symmetry being spaced distances different by the same fraction of a measuring unit from said distance between said first lines.

so that three second lines of two adjacent indicating windows intersect with three first lines of two adjacent indicating bars at three points in the region of said reference line defining two lines angularly spaced at different angles and respectively characteristic for and representing a different fraction of the measuring unit; a pair of measuring jaws respectively secured to said first and second parts and adapted to be applied to an object to be measured; indicia means on said first part, and cut-out means on said second part cooperating with said indicia means during relative movement of said parts, said indicia means being associated with at least one order higher than the order of said masuring unit; and graduations and indicia on one of said parts for indicating said measuring units and respectively located in the regions of said indicating windows so that said indicia indicate the respective measuring unit, where the pattern of the three points of intersection indicates a specific fraction of the measuring unit.

16. Measuring instrument comprising a first part and a second part connected to each other for relative movement in one direction, said first part having two parallel rows of colored indicating bars extending in said direction and said second part having two parallel rows of indicating windows respectively superimposed on said rows of indicating bars, and said indicating bars of said two rows being staggered to each other equal distances, each indicating bar being partly bounded by a pair of parallel first lines extending perpendicular to said direction and being spaced equal distances in said direction, and each indicating window being partly bounded by a pair of second lines in the form of edges inclined to each other and to said direction and respectively defining the same angle with said direction and being oppositely inclined to lines of symmetry extending between each pair of second lines perpendicular to said direction, the distances between said parallel first lines of said indicating bars being equal to the distance between two intermediate points of said two second lines of said indicating windows, all said intermediate points being aligned along a reference line extending in said one direction and said lines of symmetry being spaced distances different by the same fraction of a measuring unit from said distance between said first lines, so that three second lines of two adjacent indicating windows intersect with three first lines of two adjacent indicating bars at three points in the region of said reference line defining two lines angularly spaced at different angles and respectively characteristic for and representing a different fraction of the measuring unit; a pair of measuring jaws respectively secured to said first and second parts and adapted to be applied to an object to be measured; indicia means on said first part, and cutout means on said second part cooperating with said indicia means during relative movement of said parts, said indicia means being associated with at least one order higher than the order of said measuring unit; and graduations and indicia on one of said parts for indicating said measuring units and respectively located in the regions of said indicating windows so that said indicia indicate the respective measuring unit, where the pattern of the three points of intersection indicates a specific fraction of the measuring unit.

References Cited in the file of this patent

UNITED STATES PATENTS

| Number | Name | Date |
|---|---|---|
| 1,231,934 | Packet | July 3, 1917 |
| 1,415,627 | Giambisi | May 9, 1922 |
| 2,246,002 | Powers | June 17, 1941 |

FOREIGN PATENTS

| Number | Country | Date |
|---|---|---|
| 72,395 | Switzerland | May 16, 1916 |
| 632,237 | Germany | Aug. 18, 1933 |
| 22,771 | Finland | Mar. 11, 1948 |